Jan. 8, 1929.

H. L. DE ZENG 1,698,013

PROJECTION DEVICE

Filed Sept. 13, 1924    3 Sheets-Sheet 1

INVENTOR
Henry L. DeZeng
BY
Harry H. Styll
ATTORNEY

Jan. 8, 1929.　　　　　　　　　　　　　　　　　　　　1,698,013
H. L. DE ZENG
PROJECTION DEVICE
Filed Sept. 13, 1924　　　　3 Sheets-Sheet 2

INVENTOR
Henry L. DeZeng
BY
Harry H. Styll
ATTORNEY

Jan. 8, 1929.

H. L. DE ZENG 1,698,013

PROJECTION DEVICE

Filed Sept. 13, 1924   3 Sheets-Sheet 3

INVENTOR
Henry L. DeZeng.
BY
Harry H. Styll
ATTORNEY

Patented Jan. 8, 1929.

1,698,013

UNITED STATES PATENT OFFICE.

HENRY L. DE ZENG, OF GENEVA, NEW YORK, ASSIGNOR TO DE ZENG STANDARD COMPANY, OF CAMDEN, NEW JERSEY, A CORPORATION OF NEW JERSEY.

PROJECTION DEVICE.

Application filed September 13, 1924. Serial No. 737,557.

This invention relates to optical testing apparatus and has particular reference to a chart projection device for use in connection with eye testing such as the testing of visual acuity, color sense and ocular muscles, etc.

Prior to my invention refractionists performing eye testing have usually provided themselves with a set of charts which included lines of type of varying sizes as well as astigmatic dials, etc. In some cases all of such indicia and charts are mounted together and all visible at the same time. These charts are generally used in a dark room so that the chart itself must be suitably illuminated in order that the person whose eyes are being tested may see the same. There have been several defects in this prior art system of testing eyes. One of the principal objectionable features has been in the fact that the illumination of the charts has hardly ever been uniform; for example, in certain set-ups the chart may be well illuminated at its borders whereas its central portion does not have the same intensity of light directed upon it. It will be readily seen from this that with such a condition the patient's refractive errors cannot be accurately determined. Another disadvantage of the old system has resided in the fact that a plurality of test objects are visible to the patient at the same time.

It has been found that such an arrangement tends to interfere with the patient's focusing his attention upon the particular test object desired.

There have been some cabinets made up wherein a plurality of test objects are mounted in such a way as to be capable of selective positioning when desired but the majority of such cabinets have been bulky, the method of illumination has been no better than in the plain old wall charts, and frequently they are not capable of ready manipulation by the refractionists.

I have overcome the objectionable features of such prior art devices by providing a projection device which may be mounted close to the patient so that the operator may conveniently manipulate the same without leaving his seat and at the same time the device will insure perfect and uniform illumination.

One of the principal objects of my invention is to provide a device whereby a plurality of eye testing charts may be selectively projected on a screen whereby visual acuity or other optical tests may be made.

Another object of my invention is to provide such a device whereby a plurality of test objects are rotatably mounted so as to be possible of selective positioning in relation to a projection machine.

Another object is to provide such a device wherein the intensity of illumination of the various test objects will be uniform throughout the entire chart.

Still another object is to provide such a device whereby the patient's color sense and ocular muscles may be tested.

Still another object is to provide such a device wherein certain of the test objects may be superimposed whereby to obtain different colored charts for use in the visual acuity test.

A still further object is to provide such a device which may be focused so as to be capable of use at different distances from the screen.

A still further object is to provide means whereby every test object will be positioned directly in line with the eyes of the patient.

With these and other objects in view the invention resides in the novel features of construction, the arrangement of parts hereinafter fully set forth, illustrated in the accompanying drawings and specifically pointed out in the appended claims.-

In the drawings forming a part of this specification:

Similar reference characters designate corresponding parts through the several views.

Figure 1:
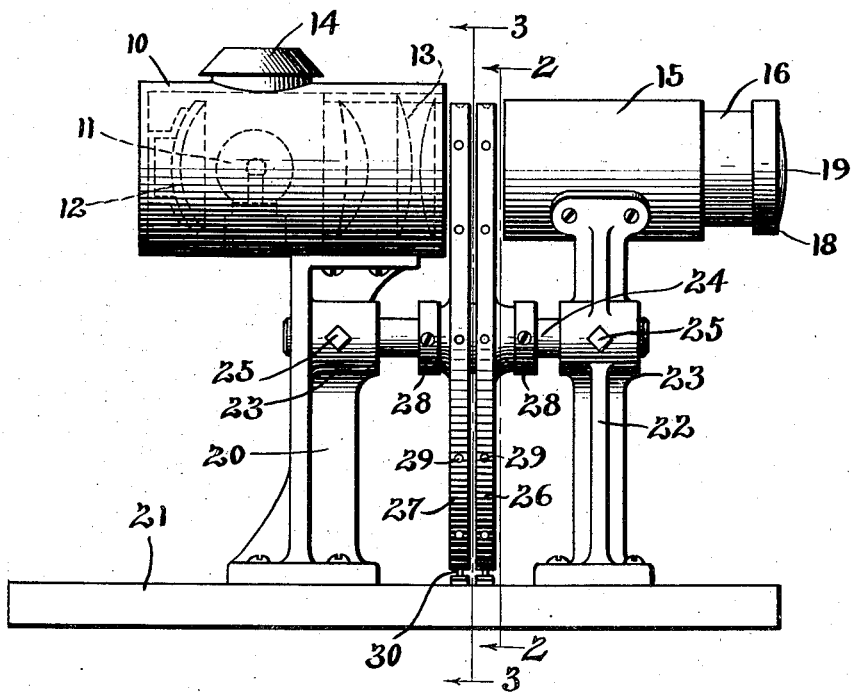
Figure 1 is a side elevation of a projection device embodying the invention.

Referring now particularly to Figures 1, 2, 3 and 4, I have provided an optical projection apparatus which comprises a lamp housing 10 having mounted therein a source of illumination 11 behind which is disposed a reflector 12 which may be of any desired shape or material. The reflector 12 is adapted to project a beam of light through the light passageway of the apparatus and in the path of these light rays a condensing lens system 13 which may be built up as clearly shown in the drawings, or of any other desired optical form.

Preferably on the upper surface of the lamp housing 10 I provide a cover 14 which may be readily removed for the inspection or adjustment of the lamp 11 or condensing lens 13.

Figure 4:
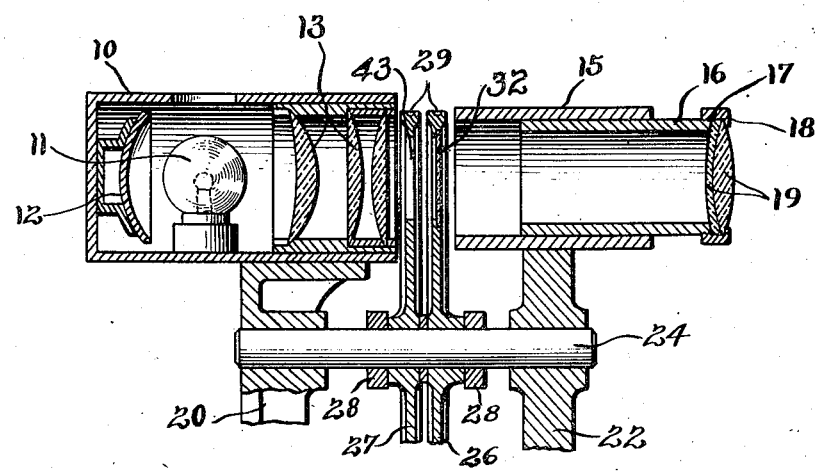
Figure 4 is a detail sectional view through the projection apparatus.

Forwardly disposed from the lamp housing 10 and in axial alinement therewith, I mount a tubular bearing member 15 which is adapted to slidably receive the adjustable sleeve 16. As best shown in Figure 4 the sleeve 16 is threaded at its forward extremity as at 17 for engagement by a knurled clamping annulus 18 which is adapted to securely hold in place the projection lenses 19.

The lamp housing 10 is rigidly supported as by a support or standard 20 mounted upon the base plate 21 and the tubular member 15 is held in fixed relation to the lamp housing by being mounted on the standard or support 22 which is also fixed on the base 21. The standards 20 and 22 have secured thereto, as at 23, a longitudinal shaft member 24 which is held against rotation by means of the lock screws 25. Rotatably mounted upon the shaft 24 are a plurality of discs 26 and 27 which are held against longitudinal movement by the collars 28. The discs 26 and 27 are independently adjustable, that is, each one may be rotated independently of the other and their peripheries are preferably provided with suitable depressions, as at 29 for the engagement of the spring pressed detents 30. The detents 30 are adapted to hold the discs in desired adjusted position so that there will be no possibility of their accidental displacement.

Figure 2:
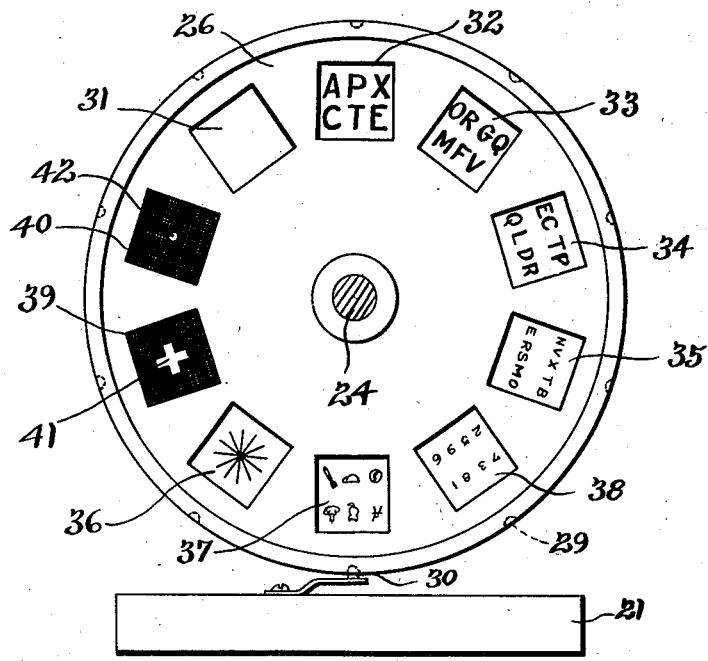
Figure 2 is a transverse sectional view on the line 2—2 of Figure 1.
Figure 3:
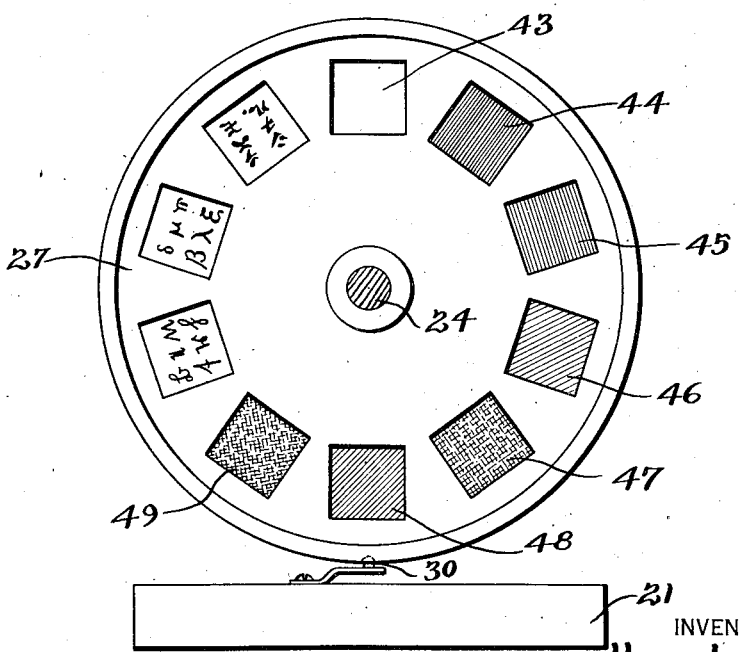
Figure 3 is a sectional view on the line 3—3 of Figure 1.

Referring particularly to Figures 2 and 3 it will be noted that I form the discs with a plurality of openings here shown as 10 in number but which obviously may be any number desired depending upon the requirements of the particular outfit. On the disc 27 I leave one opening 31 entirely unobstructed and mount in the other openings a number of different test objects 32, 33, 34, 35, 36, 37, 38, 39 and 40. The plates or test objects 32, 33, 34 and 35 are here shown as carrying test letters of different sizes and it will be noticed that each letter on a plate is the same size whereas the letters on the adjacent plates vary from one another. The plate 36 may carry any suitable astigmatic chart consisting in radial lines for the purpose of determining cylindrical aberrations. The plate 37 has a number of pictorial representations of a simple character and are principally adapted for use in testing eyes of children or illiterates. If desired, I may have a plate 38 provided with figures instead of letters and it may be best to state here that the figures may all be of the same size or each line of figures may differ from the adjacent line if desired. Also, in place of the letters as illustrated on plates 32 to 35 inclusive, I may have other plates having German, Chinese, Hebrew, or other characters if desired. The plate designated by 39 contains what is known as a Greek cross 41 which consists of a clear space in the form of cross on a perfectly black background while the plate 40 has a minute clear spot 42 preferably circular in form on a black background. The Greek cross 41 and light spot 42 are used in connection with muscle testing as is well known in the art.

The plates 32 to 40, inclusive, may be mounted on the carrier 26 in any desirable manner and they will preferably be formed of glass with the indicia suitably applied so as to give a clear definition when projected upon the screen. The method of producing these plates does not form a part of the present invention but they may be made in accordance with the invention of Edgar D. Tillyer and A. E. Glancy, Serial No. 615,604, filed January 29, 1923.

The rotatable carrier 27 is preferably of the same form of construction as the member 26 and is provided with one unobstructed opening 43. In the remaining openings I provide a red transparent screen 44, a blue screen 45, a green screen 46, a yellow screen 47, a purple screen 48, an orange screen 49, or any other colors which I may find advantageous. By rotating the carrier 26 so that when it is open, space 31 is in alinement with the light passageway, I can project upon the screen a surface of uniform color by selectively using the screens 44 to 49 inclusive. This would be very advantageous in connection with determining the color sense of the patient. Also, I may use the same color plates in connection with the visual acuity tests of the carrier 26. I have found that particularly with people afflicted with color blindness that lines and other test objects appearing in black are sometimes more noticeable when on a colored background rather than on a light background, so that with my construction I can get any arrangement that I find necessary.

In the use of my device, the patient being examined is fitted with a trial frame or Phoroptor or other similar device and the various charts are selectively projected upon the screen placed directly in front of the patient. In view of the fact that the projection lens carrying member 16 is slidably mounted in relation to the condensing lens and source of illumination, the apparatus may be properly focused so that the height of the projected test objects will subtend the proper angle in relation to the distance between the patient's eye and the screen. This is important in so far as it makes no difference what the size of the refractionist's office may be. He can adjust the mechanism to give scientifically correct results. Also it will be obvious that a chart projected from an optical projection machine of this type will be uniformly illuminated so that the results obtained will be entirely dependable.

Figure 5:
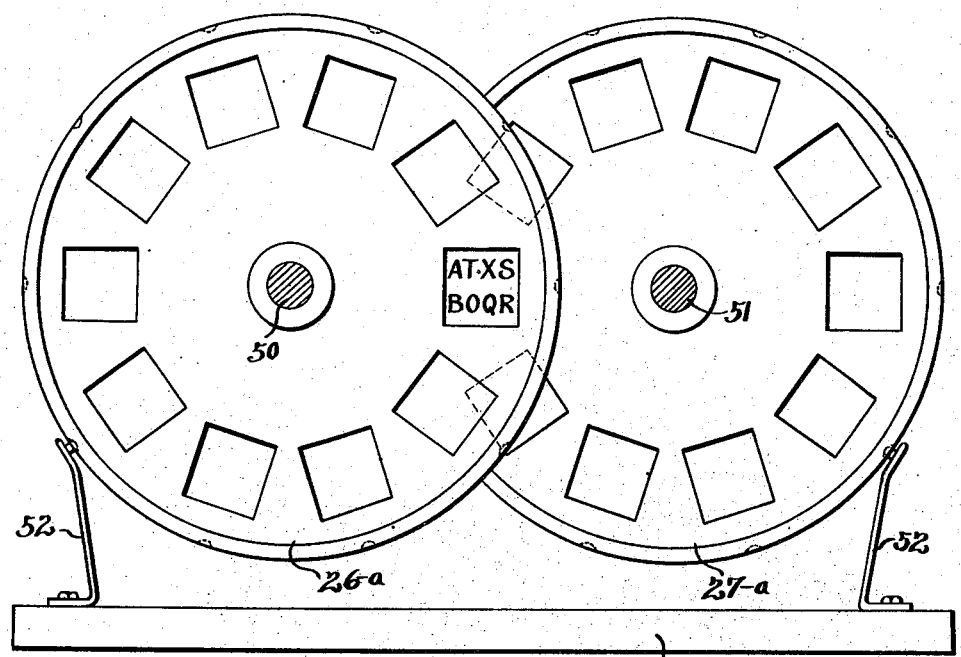
Figure 5 is a transverse sectional view through a modified form of apparatus.
Figure 6:
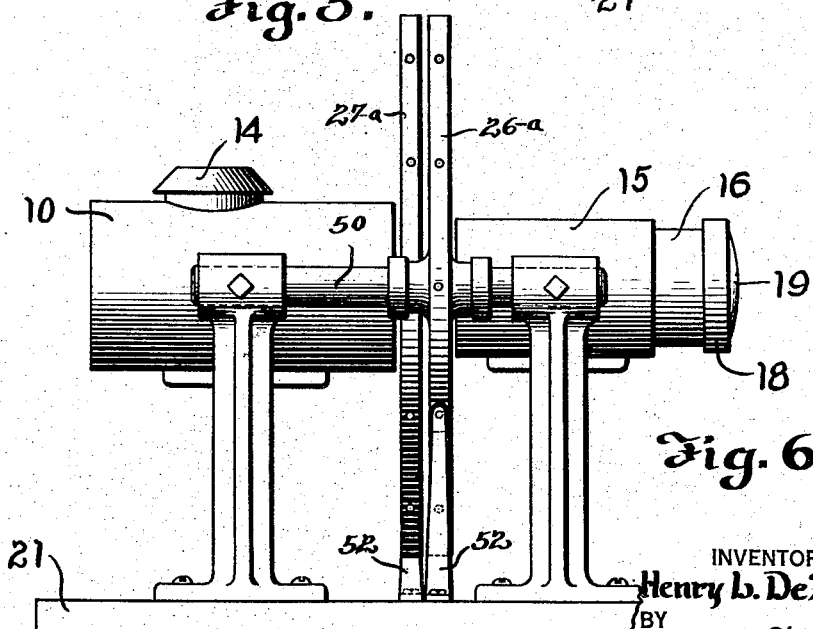
Figure 6 is a side elevation of the device as shown in Figure 5.

Referring now particularly to Figures 5 and 6 I have illustrated a modified form of the invention wherein the carrriers 26^A and 27^A are each mounted on a separate shaft 50 and 51, respectively. These shafts being disposed on each side of the lamp housing as is clearly shown. The distance between the shafts 50 and 51 and the diameters of the carriers 26^A and 27^A are such that the carrier members overlap one another as best shown in Figure 5 and the test objects are disposed in the overlapping portions so as to be in axial alinement with the light passageway of the projection machine. Also in this construction I have illustrated a slightly different form of detent which is mounted as at 52 for the purpose of holding the carrier plates in the desired operative position.

From the foregoing, it will be apparent that I have provided an important apparatus which will project upon a screen suitable test objects for use in eye testing work. My device will be capable of use both for determining the refractive errors of the eye, muscle testing, and color sense and it may be used in any size of room and properly adjusted so as to give the desired size of test object. Also, the illumination will be uniform and on the whole the charts will be scientifically correct. Of course it will be obvious that changes may be resorted to in the minor details of construction, combination and arrangement of parts falling within the scope of the appended claims without departing from the spirit of my invention.

Having thus described my invention, I claim:—

1. In a device of the character described, a support, a light projection housing, a bracket on the support carrying said housing, a focusing housing longitudinally aligned with the first housing and spaced therefrom, a bracket on the support carrying the focusing housing, a shaft supported by the brackets, a pair of overlying perforated discs rotatably mounted on said shaft and extending between the two housings in a plane transverse to the line of light projection of the housings whereby the perforations may be axially aligned with the line of light projection by the rotation of the discs, said discs having separated peripheral stop means spaced relatively to the perforations in the discs, yielding means on the support adapted to engage the stop means whereby each disc will be frictionally stopped with one of its perforations aligning with the line of light projection of the housings so that the perforations in the two discs will overlie each other, one perforation of each disc being clear for colorless vision therethrough, the remaining perforations of one disc having insignia therein and the remaining perforations of the other disc having plain colored transparent members therein whereby the insignia of one disc may be projected in white or colored light by aligning the desired insignia with the colorless or colored member of the other disc.

2. In a device of the character described, a support, a light projection housing, a bracket on the support carrying said housing, a focusing housing longitudinally aligned with the first housing and spaced therefrom, a bracket on the support carrying the focusing housing, a shaft supported by the brackets, a pair of overlying perforated discs rotatably mounted on said shaft and extending between the two housings in a plane transverse to the line of light projection of the housings whereby the perforations may be axially aligned with the line of light projection by the rotation of the discs, said discs having separated peripheral stop means spaced relatively to the perforations in the discs, yielding means on the support adapted to engage the stop means whereby each disc will be frictionally stopped with the perforation aligning with the line of light projections of the housing so that the perforations in the two discs will overlie each other, one perforation of each disc being clear for colorless vision therethrough, the remaining perforations of one disc having insignia therein and the remaining perforations of the other disc having plain colored transparent members of different colors therein whereby the insignia of one disc may be projected either in white or colored light by aligning the desired insignia with the colorless or colored members of the other disc.

3. In combination with an optical projection device, a pair of perforated overlying rotatable plates, said perforations being adapted to axially align one with the other, said plates having separated peripheral stop means spaced relatively to the said perforations, a plurality of test objects and a blank provided for the perforations of one of the plates, a plurality of transparent colored members and a transparent clear member in the perforations of the other plate, and yielding detents adapted to engage the spaced stop means of the two plates whereby the perforations of one plate will be axially aligned with the perforations of the other plate so that the test objects of one plate may be projected either in white or colored light by aligning the desired insignia with the colored or clear members in the perforation of the other plate, the said overlying rotatable plates being so aligned with the projection device that the perforations may be brought into axial alignment with the line of light projection of the projection device.

HENRY L. DE ZENG.